3,269,928
PERFLUOROAROMATIC COMPOUNDS
Robert N. Haszeldine, Disley, and John M. Birchall, Manchester, England, assignors to Pennsalt Chemicals Corporation, Philadelphia, Pa., a corporation of Pennsylvania
No Drawing. Filed Apr. 5, 1962, Ser. No. 185,221
Claims priority, application Great Britain, Apr. 19, 1961, 14,200/61
5 Claims. (Cl. 204—158)

This invention concerns a novel reaction between highly fluorinated aromatic compounds and chlorosilanes to provide novel fluoroaromatic substituted silanes. The invention also concerns novel derivatives of such fluoroaromatic substituted silanes and improve methods of preparing polyfluoroaromatic compounds.

The reaction of chlorosilanes with fluoroolefins is known; for example, tetrafluoroethylene reacts with trichlorosilane to form an addition product of the formula $SiCl_3CF_2CF_2H$. The reaction of chlorosilanes with highly fluorinated aromatic compounds might be expected to follow a similar course resulting in an addition product, but it has been surprisingly found that the reaction follows a completely different course. Instead of an addition product, a substitution product is formed in which a fluorine atom is eliminated from the aromatic ring and a chlorine atom on the silicon atom is replaced by fluorine.

The reaction may be written as follows:

$$Ar_fF + SiHCl_{3-n}R_n \rightarrow Ar_fSiFCl_{2-n}R_n + HCl$$

where $Ar_f$ is a highly fluorinated aryl radical, R is hydrogen, alkyl, aryl, fluoroalkyl, fluoroaryl, or fluorine, and $n$ is zero or an integer of 1 or 2. When, in the above formulae, $n$ is 2 the R substituents may be the same or different.

The fluoroaryl radical $Ar_f$ will preferably be a perfluoroaryl radical. Also included in this invention are fluoroheterocyclic radicals having aromatic characteristics. The preferred $Ar_f$ radicals are perfluoroaryl radicals such as perfluorophenyl and perfluoronaphthyl radicals. The $Ar_f$ radicals may be substituted with alkyl or perfluoroalkyl groups; e.g., methyl, perfluoromethyl, ethyl, isopropyl, n-butyl, t-butyl, perfluoroethyl, etc. Thus, examples of specific perfluoroaryl radicals will include perfluorophenyl, perfluorotolyl, perfluoronaphthyl, perfloro(methylnaphthyl), perfluoroxylyl, perfluoro(ethylphenyl), 2,3,4,5-tetrafluorotolyl, 2,3,5,6-tetrafluorotolyl, 2,3,4,5,6,7-hexafluoronaphthyl, 2,3,4,5-tetrafluorophenylethyl, 2,3,5-trifluoro-4-methylpyridyl, and the like. In general the fluoroaryl radical will be any of the defined fluorinated aryl radicals which contain from 6 to 12 carbon atoms. The R radicals defined above will preferably be hydrogen, fluorine, lower alkyl and fluoroalkyl radicals (e.g. methyl, ethyl, propyl, butyl) perfluoromethyl, etc. and aryl and fluoroaryl radicals containing six to ten carbon atoms (e.g. phenyl, perfluorophenyl, perfluorotolyl, ethylphenyl, naphthyl, etc.).

More specifically, when the reactants are hexafluorobenzene and trichlorosilane the reaction is as follows:

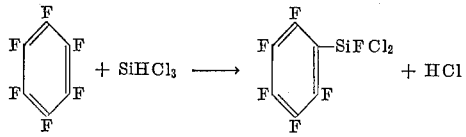

The surprising features of the reaction are (a) that it is the first reported instance of free radical attack upon a highly fluorinated aromatic system to give an aromatic product and (b) that in the course of the reaction a fluorine atom migrates from the aromatic nucleus to the silicon atom.

The reaction is favored by conditions conducive to the formation of free radicals, particularly irradiation by ultraviolet light and/or heat. Chemical initiators may be used as well as or instead of such external activation energy sources. The chemical initiators used may be of any of those usually used in initiating free radical reactions including organic peroxides such as benzoyl peroxide and azo-compounds such as dimethyl-azo-diisobutyrate. When using actinic radiation as the initiating agent heat is not essential and the reaction may be conveniently conducted at room temperature or lower. With chemical initiators, however, heat will usually be required and temperatures of from 50° to 500° C. are found satisfactory.

As indicated by the formula given, the product of the reaction is mainly a mono-substituted aromatic compound. This is particularly so when a molar excess of the fluoroaromatic compound is used. However, when substantially equimolar quantities, or a major excess of the silane are used, some higher substitution products are obtained, e.g.

$$C_6F_6 + 2SiHCl_3 \rightarrow C_6F_4(SiFCl_2)_2 + 2HCl$$

The reaction is generally applicable to all highly fluorinated aromatic compounds, including highly fluorinated compounds containing a heterocyclic ring having aromatic characteristics such as perfluoropyridine. For the avoidance of doubt, it is here stated that the definition of "$Ar_f$," as defined above, is intended to include radicals derived by the removal of a fluorine atom from the aromatic ring of such highly fluorinated compounds. The heterocyclic $Ar_f$ radicals will be derived from heteracyclic compounds such as

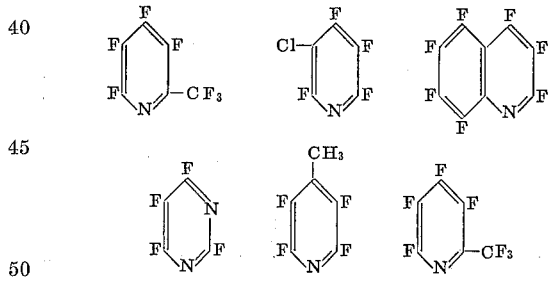

and the like. Particularly preferred perfluoroaromatic compounds are those of the formula $C_6F_m(R_f)_{6-m}$, where $R_f$ is perfluoroalkyl and $m$ is an integer of from 1–6.

The preferred mono-substituted products of the invention form a new class of aromatic substituted silanes of the formula $Ar_fSiFCl_{2-n}R_n$, where $Ar_f$, R, and $n$ are as defined above. Particularly preferred products are those of the formula $Ar_fSiR'FX$ where R' is hydrogen, alkyl, aryl, fluoroalkyl or fluoroaryl, and X is chlorine or fluorine, the alkyl, aryl, fluoroalkyl and fluoroaryl radicals containing from one to ten carbon atoms. The silane products of this latter formula are readily hydrolyzable by water to form a series of novel silicones and polysiloxanes which are stable thermally and particularly stable to water and acids. In strong aqueous alkali further hydrolysis of the silicones and polysiloxanes takes place in the course of which the silicon atom on the perfluoroaromatic nucleus is replaced by hydrogen. This is a particularly useful reaction since once a hydrogen is introduced into a perfluoroaromatic system it provides a point for further chemical attack thereby enabling conversion into other useful chemicals.

The novel silicones which may be prepared according to this invention from the mono-substituted derivatives are of the general formula $(Ar_fSiR'O)_z$ where $Ar_f$ and R' are as previously defined and z is an integer. They may be prepared by reacting the fluoroaromatic compound with a silane of the formula R'SiHClX followed by hydrolysis of the silane formed with water, e.g.

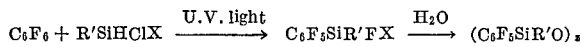

Where the starting silane is dichlorosilane there arises the possibility of a two stage reaction with the fluoroaromatic compound, for example:

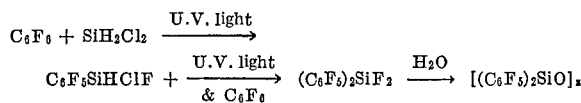

The novel siloxanes which may be prepared according to this invention from the mono-substituted derivatives are of the general formula $(Ar_fSiO_{1.5})_z$ where $Ar_f$ and z are as previously dfined. They may be prepared by the reaction of the fluoroaromatic starting compound with a silane of the formula SiHClXY where X and Y are fluorine or chlorine, followed by hydrolysis with water, for example:

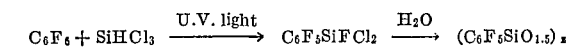

Where hydrolysis is carried out on a silane of structure $Ar_fSiR'_2F$ where R' is alkyl, aryl, fluoroalkyl or fluoroaryl, the products obtained are disiloxanes, viz:

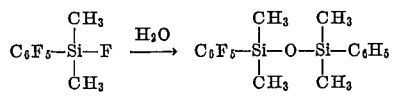

As stated above the novel silicones and polysiloxanes are highly stable except to strong alkali in which they are further hydrolyzed, for example:

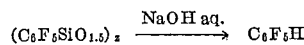

There is of course no need to proceed via a silicone or polysiloxane to obtain the hydrogen containing perfluoroaromatic derivative, since the silane products, including those containing only one halogen atom attached to the silicon atom, may be hydrolyzed directly by strong alkali, e.g.

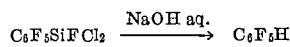

It will be seen therefore that the invention provides a route to monohydro-perfluoroaromatic compounds which is especially useful for preparing compounds of the type $C_6F_{m-1}H(R_f)_{6-m}$, where m is 1–6. Particularly the invention provides a new route to pentafluorobenzene and the best method yet produced for the conversion of hexafluorobenzene into pentafluorobenzene. From pentafluorobenzene and othr monohydro-perfluoroaromatic compounds other useful intermediates may be prepared such as $C_6F_5I$ and $C_6F_5Br$.

The higher substituted silane products, which may, as indicated, be obtained by the reaction of the perfluoroaromatic compound with an equimolar or a molar excess of the silane, with or without the separation of a lower substituted intermediate, are also subject to hydrolysis in a similar manner to the mono-substituted products. Of particular note are the polyhydroperfluoroaromatic compounds which are formed by hydrolysis in strong aqueous alkali, e.g.

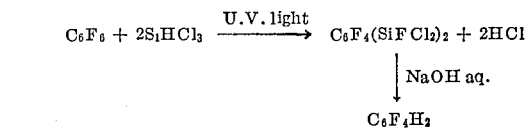

Besides being useful intermediates, the thermal and chemical stability under neutral and acid conditions of the silicones and siloxanes renders them useful as lubricant oils and greases and resins.

The invention is illustrated by the following examples:

EXAMPLE 1

*(a) Preparation of (pentafluorophenyl) dichlorofluorosilane*

Dry hexafluorobenzene (10.0 g., 0.054 mole) and freshly distilled trichlorosilane (8.0 g., 0.059 mole) were sealed into a 350 ml. silica tube and irradiated by a 500 watt mercury discharge tube for 250 hours. The reaction tube was shaken vigorously throughout this period. At the end of the irradiation, the tube was cooled to −95° C., and volatile products (790 ml. at N.T.P.; M.W. 38.9) were transferred to a high-vacuum apparatus and identified by infrared spectroscopy as hydrogen chloride containing traces of silicon tetrafluoride. The liquid reaction products wer transferred and distilled under dry nitrogen and yielded fractions boiling 80–148° C. (1.8 g.) and 148–170° C. (6.2 g.). The latter fraction was redistilled under reduced pressure and gave (pentafluorophenyl) dichlorofluorosilane (5.0 g.). (Found: C, 25.2, Cl, 25.1, F, 38.9%. $C_6Cl_2F_6Si$ requires: C, 25.3, Cl, 24.9, F, 40.0%), B.P. 54° C./13 mm. Gas-liquid chromatographic analysis of the remaining fractions from the distillations showed that some hexafluorobenzene (2.2 g., 22%) remained unreacted, and analysis of the silicon-containing fractions by hydrolysis showed that the total yield of (pentafluorophenyl) dichlorofluorosilane was at least 7.2 g. (60% based on hexafluorobenzene transformed).

*(b) Hydrolysis of (pentafluorophenyl) dichlorofluorosilane*

Water (25 ml.) was added in five portions to (pentafluorophenyl) dichlorofluorosilane (24.0 g.) contained in a partially evacuated 2.5 liter bulb; a vigorous reaction occurred at each addition and a white polysiloxane was formed. Aqueous sodium hydroxide (40%; 100 ml.) was then added slowly and the reaction was completed by heating on a steam bath for 15 minutes. The volatile contents of the bulb were transferred to a high-vacuum apparatus, dried with phosphorus pentoxide, and identified as pentafluorobenzene (10.0 g., 71%) by elemental analysis and molecular weight measurement. (Found: C, 42.8%; H, 0.9%; M, 168. Calc. for $C_6HF_5$: C, 42.8; H, 0.6%, M, 168.) The purity of this product was confirmed by gas-liquid chromatography.

EXAMPLE 2

*Reaction of 2,3,4,5,6-pentafluorotoluene with trichlorosilane*

2,3,4,5,6-pentafluorotoluene (18.4 g., 0.10 mole) and trichlorosilane (14.8 g., 0.11 mole), in a 350 ml. sealed silica tube, were irradiated by a 500 watt mercury discharge lamp for 192 hours. The gaseous products (1331 ml. at N.T.P. Found: M 44) were shown by infrared spectroscopy to consist of hydrogen chloride, silicon tetrafluoride, and a trace of carbon dioxide. The liquid products were distilled and gave 2,3,4,5,6-pentafluorotoluene (9 g.), B.P. 116–120° C., and a fraction B.P. 92–99° C./ 37 mm. (7 g.). The latter was redistilled to give a liquid (5.6 g., 39% based on pentafluorotoluene converted), B.P. 98–99° C./37 mm., which was shown to consist of a mixture of isomeric (methyltetrafluorophenyl) dichlorofluorosilanes by elemental analysis. (Found: C, 29.8, H. 1.1. $C_7H_3Cl_2F_5Si$ requires: C, 29.8, H, 1.1%) and gas-liquid chromatography. The infrared spectrum of this product was consistent with the proposed structure.

By following the procedural details given in the above examples, the following reactions may be carried out to obtain the products indicated:

| $Ar_f$ | $SiHCl_{3-n}R_n$ | Product |
|---|---|---|
| 2,3,4,5-tetrafluoro-(trifluoromethyl)benzene | $SiHCl_2CH_3$ | tetrafluoro(trifluoromethyl)phenyl-$SiFClCH_3$ and meta and para isomers |
| pentafluoronaphthalene | $SiHCl_2F$ | tetrafluoronaphthyl-$SiF_2Cl$ and alpha isomer |
| tetrafluoropyridine | $SiH_2Cl_2$ | trifluoropyridyl-$SiFHCl$ and meta and para isomers |
| 1,4-bis(trifluoromethyl)tetrafluorobenzene | $SiHCl_2C_6H_5$ | bis(trifluoromethyl)trifluorophenyl-$SiFClC_6H_5$ and isomers |
| pentafluorobenzene | $SiHCl_2C_6H_5$ | tetrafluorophenyl-$SiFClC_6H_5$ |
| 4-(trifluoromethyl)tetrafluorobenzene | $SiH_2Cl_2$ | bis[(trifluoromethyl)tetrafluorophenyl]-$SiF_2$ |
| pentafluorobenzene | $SiHCl(CH_3)_2$ | tetrafluorophenyl-$SiF(CH_3)_2$ |
| heptafluoroquinoline | $SiHCl(CH_3)_2$ | hexafluoroquinolyl-$SiF(CH_3)_2$ and isomers |
| pentafluoropyridine | $SiHCl_2F$ | tetrafluoropyridyl-$SiF_2Cl$ and isomers |

| $Ar_f$ | $SiHCl_{3-n}R_n$ | Product |
|---|---|---|
| 4-methyl-2,3,5,6-tetrafluoro-(trifluoromethyl)benzene | $SiH_2Cl_2$ | methyl(trifluoromethyl)trifluorophenyl-$SiFHCl$ and isomers |
| propyltetrafluorobenzene | $SiHCl_2C_6H_5$ | propyltrifluorophenyl-$SiFClC_6H_5$ and isomers |
| methylhexafluoronaphthalene | $SiHCl(CH_3)_2$ | methylpentafluoronaphthyl-$SiF(CH_3)_2$ and isomers |

Likewise when the caustic hydrolysis step of Example 1 is carried out, products are obtained as follows:

| Compound Hydrolyzed | Product Obtained |
|---|---|
| heptafluoronaphthyl-$SiF_2Cl$ | octafluoronaphthalene (with H) |
| tetrafluoropyridyl-$SiFHCl$ | pentafluoropyridine derivative (with H) |
| bis(trifluoromethyl)trifluorophenyl-$SiFClC_6H_5$ | bis(trifluoromethyl)tetrafluorobenzene (with H) |

If instead of using strong alkaline hydrolysis, simple aqueous hydrolysis is employed, silicones and siloxanes may be obtained as follows:

Compound hydrolyzed:            Product obtained
$(C_6F_5)_2SiF_2$             $[(C_6F_5)_2SiO]_x$
$(CF_3—C_6F_4)_2—SiF_2$      $[(CF_3—C_6F_4)_2—SiO]_x$
$(CF_3—C_6F_4—SiFCl_2)$     $(CF_3—C_6F_4—SiO_{1.5})_x$ It will be obvious to the skilled art worker that numerous changes and variations may be made from the above description of the invention and the examples without departing from its spirit and scope.

We claim:

1. The process of preparing a fluorinated aryl substituted fluorosilane which comprises reacting in the presence of a free radical initiator, a highly fluorinated aromatic compound containing 6 to 12 carbon atoms and containing at least 4 fluorine atoms attached to the nucleus of the aromatic ring with a silane having the structure $SiHCl_{3-n}R_n$ where R is a member of the group consisting of hydrogen, fluorine, alkyl, aryl, fluoroalkyl and fluoroaryl radicals and $n$ is a number from 0 to 2.

2. The process of preparing a perfluoroaromatic substituted fluorosilane which comprises reacting a perfluoroaromatic compound with a silane having the structure $SiHCl_{3-n}R_n$ where R is a member of the group consisting of hydrogen, fluorine, alkyl, aryl, fluoroalkyl and fluoroaryl radicals and $n$ is a number from 0 to 2, said reaction occurring in the presence of a free radical initiator.

3. The process of preparing (methyltetrafluorophenyl) dichlorofluorosilane which comprises reacting 2,3,4,5,6-pentafluorotoluene with trichlorosilane in the presence of a free radical initiator.

4. The process of preparing (pentafluorophenyl)dichlorofluorosilane which comprises reacting hexafluorobenzene and trichlorosilane in the presence of a free radical initiator.

5. The process of claim 4 wherein the free radical initiator is ultraviolet light.

References Cited by the Examiner

UNITED STATES PATENTS

| 2,511,820 | 6/1950 | Barry et al. | 260—448.2 |
| 2,598,436 | 5/1952 | Mohler et al. | 260—448.2 |
| 2,636,896 | 4/1953 | Frost | 260—448.2 |
| 2,929,830 | 3/1960 | Kunowski | 260—448.2 |
| 3,000,976 | 9/1961 | Patrick et al. | 260—650 |
| 3,004,077 | 10/1961 | Banks et al. | 260—650 |

FOREIGN PATENTS

| 534,818 | 12/1956 | Canada. |
| 1,205,608 | 2/1960 | France. |
| 706,703 | 4/1954 | Great Britain. |

TOBIAS, E. LEVOW, *Primary Examiner.*

SAMUEL H. BLECH, *Examiner.*

J. G. LEPITT, *Assistant Examiner.*